United States Patent
Reichard et al.

(10) Patent No.: US 9,285,028 B2
(45) Date of Patent: Mar. 15, 2016

(54) SELF-PROPELLING WORK VEHICLE FOR FORWARD AND REVERSE DRIVE

(75) Inventors: Maxwell Reichard, Gainesville, GA (US); Masahiro Yamada, Norcross, GA (US); Robert Walden, Gainesville, GA (US)

(73) Assignee: KUBOTA CORPORATION, Osaka (JP)

( * ) Notice: Subject to any disclaimer, the term of this patent is extended or adjusted under 35 U.S.C. 154(b) by 433 days.

(21) Appl. No.: 13/423,581

(22) Filed: Mar. 19, 2012

(65) Prior Publication Data

US 2013/0239731 A1    Sep. 19, 2013

(51) Int. Cl.
*F16H 59/02*   (2006.01)
*A01D 34/63*   (2006.01)

(52) U.S. Cl.
CPC ............... *F16H 59/02* (2013.01); *A01D 34/63* (2013.01); *F16H 2059/0256* (2013.01); *Y10T 74/2011* (2015.01); *Y10T 74/20159* (2015.01)

(58) Field of Classification Search
CPC ............................... F16H 59/02; A01D 34/63
USPC ............. 74/471 XY, 473.28, 473.33; 56/10.8, 56/10.9, 11.1, 11.2; 137/636.2; 180/6.32, 180/6.48, 19.1
See application file for complete search history.

(56) References Cited

U.S. PATENT DOCUMENTS

| | | | | |
|---|---|---|---|---|
| 2,170,715 | A * | 8/1939 | Grantham | 200/33 R |
| 4,169,443 | A * | 10/1979 | Todeschini | 123/367 |
| 4,374,500 | A * | 2/1983 | Westerfield | 111/164 |
| 4,519,266 | A * | 5/1985 | Reinecke | 74/471 XY |
| 5,841,372 | A * | 11/1998 | Matsumoto | 341/20 |
| 6,942,047 | B2 * | 9/2005 | Woytassek | 180/6.48 |
| 7,458,432 | B2 * | 12/2008 | Mayer et al. | 180/6.32 |
| 7,634,953 | B2 * | 12/2009 | Hoffman et al. | 74/480 R |
| 7,748,480 | B2 | 7/2010 | Loxterkamp et al. | |
| 8,087,481 | B2 * | 1/2012 | Trefz et al. | 180/6.32 |
| 2006/0042840 | A1 * | 3/2006 | Goto et al. | 180/6.32 |
| 2006/0053926 | A1 * | 3/2006 | Cooper et al. | 74/471 XY |

* cited by examiner

*Primary Examiner* — William C Joyce
(74) *Attorney, Agent, or Firm* — Greenblum & Bernstein, P.L.C.

(57) ABSTRACT

A self-propelling work vehicle for forward and reverse drive includes a handle unit attached to the vehicle body for a first shift movement along a first direction with a neutral position and a second shift movement from the neutral position along a second direction intersecting the first direction. Forward drive speed or reverse drive speed is determined based on the first shift movement. A guide unit attached to the vehicle body includes a maximum forward speed guide member for defining a shift movement end of the handle unit determining a maximum forward speed of the forward drive speed, and a neutral guide member for guiding the second shift movement of the handle unit from the neutral position defined as a starting position. The maximum forward speed guide member and the neutral guide member are positionally adjustable independently of each other.

22 Claims, 10 Drawing Sheets

SELF-PROPELLING WORK VEHICLE FOR FORWARD AND REVERSE DRIVE

TECHNICAL FIELD

The present invention relates to a self-propelling work vehicle for forward and reverse drive including a variable propelling power supply section for supplying forward drive power and reverse drive power to propelling drive wheels, and a handle unit for controlling the variable propelling power supply section to adjust a propelling speed of the vehicle.

BACKGROUND ART

One example of the above-noted self-propelling work vehicle is a zero-radius-turning mower (ZRTM).

The ZRTM known from U.S. Pat. No. 7,748,480 includes drive wheels driven by an engine, a mower unit and a control system. The control system has right and left control handles provided to permit control of mower speed and direction from the operator station. Each control handle is pivotally coupled to a chassis for pivotal movement about a transverse pivot axis to be pivotable from a first or neutral position in either a first direction or a second direction. Each control handle has an arm forming a pivot joint for receiving an end of the attachment member such that the attachment member and arm may pivot about a handle pivot axis contained within a vertical plane that is orthogonal to the transverse pivot axis. The pivot joint permits movement of the handles inwardly and outwardly to better accommodate operator ingress/egress.

U.S. Pat. No. 7,458,432 discloses a dual lever steering control mechanism for mounting a control lever to a mower. The dual lever steering control mechanism includes a housing, a forward/reverse lever, and a neutral position lever pivotably attached to the forward/reverse lever. The housing defines an opening for receiving the forward/reverse lever to be pivotable about a first pivot axis, and a slot for allowing the neutral position lever to be pivotable about a second pivot axis that is orthogonal to the first pivot axis. Further, a safety switch is provided for detecting entry of the neutral position lever into the slot in parking the vehicle. The neutral position lever and the control lever gripped by the operator are connected to each other to be positionally adjustable through a bolt and a plurality of slots.

While the positional relationship between the control lever and the neutral position lever is adjustable in the above mechanism, no particular consideration is given to the positional adjustment between the opening and the slot defined in the housing.

In the above-noted conventional art, it is difficult to precisely adjust the position of the guide unit defining the opening and slot for allowing shift movement in two directions of the handle levers, to the shifting positions of the handle levers. If those control levers are used for controlling a variable propelling power supply section for supplying forward drive power and reverse drive power to the drive wheels, it is required to precisely adjust the positional relationship noted above because an upper limit for the first shift movement determines a maximum forward speed.

SUMMARY OF INVENTION

The object of the present invention is to easily adjust the positional relationship between a guide unit defining a maximum forward speed and shifting positions of a handle unit.

In order to achieve the above-noted object in a self-propelling work vehicle for forward and reverse drive including a vehicle body and a variable propelling power supply section for supplying forward drive power and reverse drive power to propelling drive wheels, the work vehicle further includes a handle unit attached to the vehicle body for a first shift movement along a first direction with a neutral position and a second shift movement from the neutral position along a second direction intersecting the first direction, and a guide unit for the handle unit. Here, forward drive speed or reverse drive speed is determined based on the first shift movement. Further, the guide unit includes a maximum forward speed guide member for defining a shift movement end of the handle unit determining a maximum forward speed of the forward drive speed, and a neutral guide member for guiding the second shift movement of the handle unit from the neutral position defined as a starting position. The guide unit is attached to the vehicle body, and the maximum forward speed guide member and the neutral guide member are positionally adjustable independently of each other.

With the above arrangement, one end of the first shift movement of the handle unit for determining the forward drive speed and reverse drive speed of the work vehicle represents a shifting position for the maximum forward speed. In this, the maximum forward speed guide member for defining the shifting position is attached to the vehicle body to be adjustable in position, which provides a desired maximum forward speed at one end of the first shift movement by positionally adjusting the maximum forward speed guide member. Further, it is required in parking the vehicle to precisely adjust the shifting position of the handle unit when shifted from the neutral position of the first shift movement to the second shift movement, to the position of the neutral guide member. Such a requirement may be easily fulfilled since the maximum forward speed guide member and the neutral guide member are positionally adjustable independently of each other.

In order to simplify the guide unit, a housing may be attached to the vehicle body for receiving the guide unit to be positionally adjustable. With such an arrangement, the guide unit per se may be formed of a simple, light member such as a plate. In addition, the housing covers a proximal portion of the handle unit, thereby to protect the proximal portion of the handle unit provided with a connecting portion to a link mechanism.

The first and second shift movements in the handle unit may be achieved through oscillating movement using two pivotal axes. According to one specific arrangement, the first shift movement is movement oscillatable about a first pivotal axis and the second shift movement is movement oscillatable about a second pivotal axis, and a first oscillation bracket member is fitted on the first pivotal axis while a second oscillation bracket member is fitted on the second pivotal axis and mounted on the first oscillation bracket member. In this, a detent mechanism having a constantly-urged detent ball may be disposed between the second oscillation bracket member and a shift lever oscillatable about the second pivotal axis. With such an arrangement, the urging force provides stability in the oscillating operation and a sense of click to the operator gripping the shift lever in the reference shifting position, which ensures reliable oscillating operation.

When the guide unit further includes a movement end for defining an end of the second shift movement, such a movement end acts as a stopper to define a desired shifting position as an oscillation limit of the second shift movement.

In the above description, it is indispensable that the guide unit includes the maximum forward speed guide member for defining the maximum forward speed. Naturally, the guide unit may further include a maximum reverse speed guide member defining an end of the second shift movement of the handle unit for determining a maximum reverse speed. With such an arrangement, the operation of the handle unit may precisely determine the maximum speed in either of the forward drive movement and the reverse drive movement of the work vehicle.

DESCRIPTION OF EMBODIMENTS

Prior to describing specific embodiments of a work vehicle according to the present invention, a basic arrangement of a guide unit for assisting shift movement in a handle unit 6 for speed adjustment attached to a vehicle body of the work vehicle will be described first in reference to schematic views shown in FIGS. 1A, 1B and 2. A shift lever 60 of the handle unit 6 is operated by the operator, thereby to adjust speed of forward drive power and reverse drive power supplied to propelling drive wheels through a variable propelling power supply section such as an HST. The handle unit 6 is capable of producing a first shift movement along a first direction (direction X) with a neutral position and a second shift movement from the neutral position along a second direction (direction Y) intersecting the first direction. The first shift movement is transmitted to the variable propelling power supply section, thereby to determine the forward drive speed and reverse drive speed based on the shift movement.

A guide unit 7 includes a maximum forward speed guide member 7a for defining a shift movement end of the handle unit 6, or the shift lever 60 in this example, determining a maximum forward speed, and a neutral guide member 7b for guiding the second shift movement of the shift lever 60 from the neutral position defined as a starting position. The guide unit 7 is attached to the vehicle body, in which the maximum forward speed guide member 7a and the neutral guide member 7b are positionally adjustable independently of each other. The handle unit 6 and the guide unit 7 are indirectly attached to the vehicle body through a housing 71 for covering a supporting area of the shift lever 60 defined around a proximal portion of the handle unit 6.

Figure 1A:
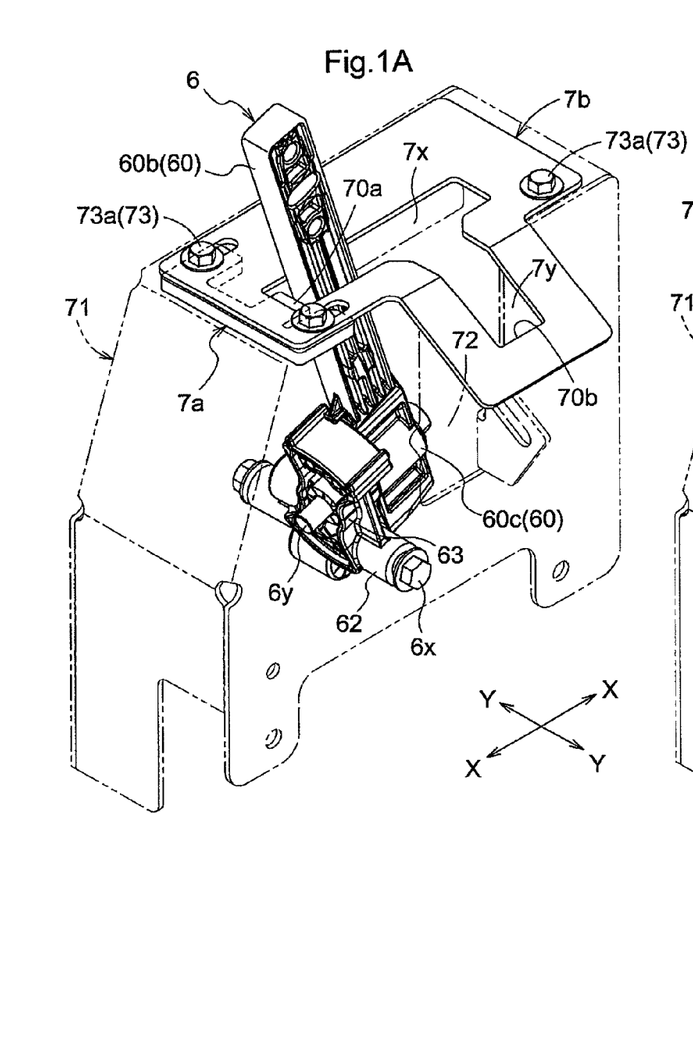
FIG. 1A is a perspective view of a basic arrangement of a handle unit in a maximum speed position and a guide unit.
Figure 1B:
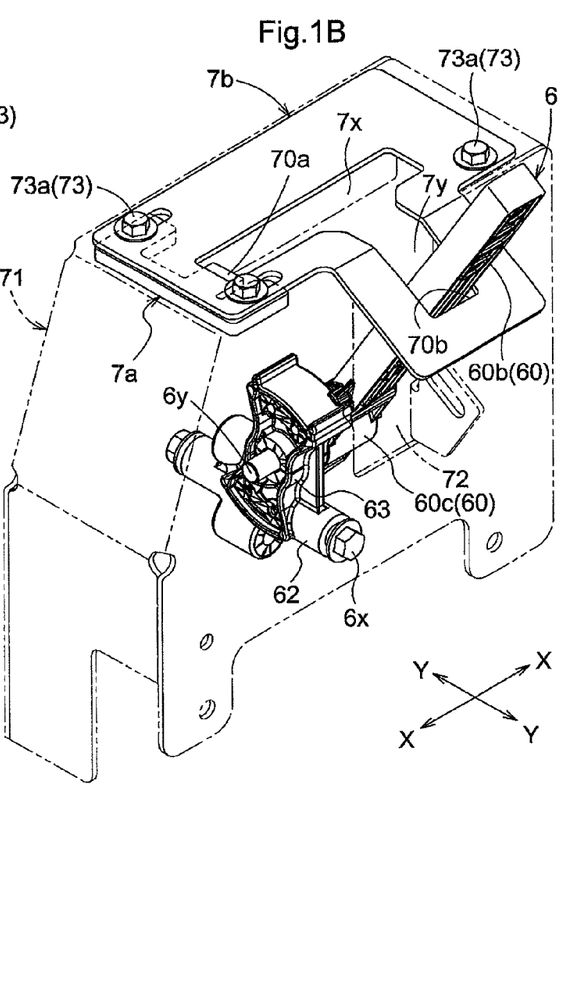
FIG. 1B is a perspective view of the basic arrangement of the handle unit in a neutral position and the guide unit.
Figure 2:
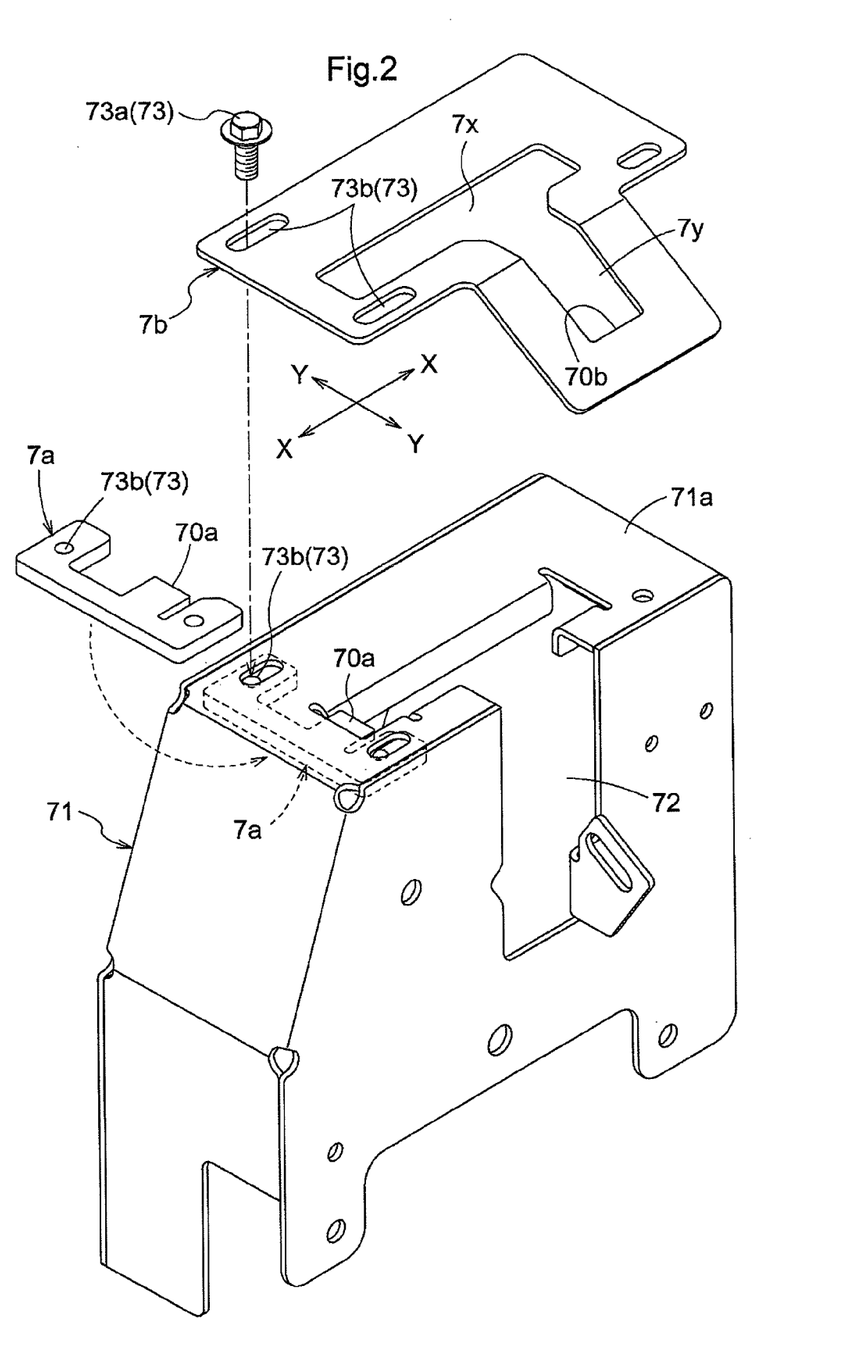
FIG. 2 is an exploded perspective view of a basic arrangement of the guide unit.

In the example shown in FIGS. 1A, 1B and 2, the first shift movement is movement oscillatable about a first pivotal axis 6x and the second shift movement is movement oscillatable about a second pivotal axis 6y. A first oscillation bracket member 62 is fitted on the first pivotal axis 6x, while a second oscillation bracket member 63 is fitted on the second pivotal axis 6y and mounted on the first oscillation bracket member 62. Thus, the shift lever 60 is moved relative to the housing 71 in the direction X as oscillated about the first pivotal axis 6x and moved in the direction Y as oscillated about the second pivotal axis 6y. To this end, the housing 71 has an opening 72 formed therein for allowing movement of the shift lever 60 both in the direction X and in the direction Y. The housing 71 also has a top surface extending along a movement path of the shift lever 60 in the direction X and acting as a mounting portion 71a of the guide unit 7.

As explicitly shown in FIG. 2, the maximum forward speed guide member 7a has a forward-drive stop surface 70a coming into contact with the shift lever 60 to define one end of a movement limit of the shift lever 60 in the direction X. On the other hand, the neutral guide member 7b has a neutral stop surface 70b coming into contact with the shift lever 60 to define one end of a movement limit of the shift lever 60 in the direction Y. A connecting member 73 is provided for attaching the maximum forward speed guide member 7a and the neutral guide member 7b to the mounting portion 71a after they are positionally adjusted independently of each other. A simple form of the connecting member 73 consists of bolt bores 73b formed in the mounting portion 71a, maximum forward speed guide member 7a and neutral guide member 7b and a bolt 73a to be inserted into those bolt bores 73b. In order to positionally adjust the maximum forward speed guide member 7a and the neutral guide member 7b relative to the mounting portion 71a for adjusting the forward-drive stop surface 70a and the neutral stop surface 70b to a specific shifting position of the shift lever 60, the bolt bore 73b in the mounting portion 71a may be formed as a slot, for example. In the illustrated example, the bolt bore 73b of the neutral guide portion 7b is also formed as a slot, while the bolt bore 73b of the maximum forward speed guide portion 7a is formed as a round bore adapted to a bolt diameter.

The maximum forward speed guide member 7a as shown is formed of plate material having tongue-like pieces for forming the round bolt bore 73b and the forward-drive stop surface 70a. On the other hand, the neutral stop surface 70b is formed of plate material having an X-direction guide groove 7x for guiding the movement of the shift lever 60 in the direction X, and a Y-direction guide groove 7y for guiding the movement of the shift lever 60 in the direction Y from the neutral position. The bolt bore 73b in the form of slot is provided in the neutral guide member 7b in a position corresponding to the bolt bore 73b formed in the mounting portion 71a. It should be noted that a projecting portion forming the Y-direction guide groove 7y is bent downward from a main body portion forming the X-direction guide groove 7x in view of that the shift lever 60 is oscillatable. Naturally, the main body portion may also be formed as a curved member or a bent member.

The positional adjustment and fixation of the maximum forward speed guide member 7a and the neutral guide member 7b relative to the mounting portion 71a may be made according to the following steps:

1. To attach the shift lever 60 to the housing 71.
2. To set the shift lever 60 to a shifting position in which the variable propelling power supply section is in neutral (neutral position).

3. To position the neutral guide member 7b to allow the shift lever 60 present in the neutral guide member 7b to move in the direction Y from the neutral position to the neutral stop surface 70b.

4. To set the shift lever 60 to the maximum forward speed position.

5. To insert the bolt 73a into one set of the rearward bolt bores 73b of the mounting portion 71a and the neutral guide member 7b to fix the neutral guide member 7b to the mounting portion 71a.

6. To position the maximum forward speed guide member 7a to bring the forward-drive stop surface 70a of the maximum forward speed guide member 7a into contact with the shift lever 60.

7. To insert the bolts 73a into the two front bolt bores 73b formed in the mounting portion 71a, maximum forward speed guide member 7a and neutral guide member 7b, thereby to fix the maximum forward speed guide member 7a to the mounting portion 71a along with and the neutral guide member 7b.

Although the maximum forward speed guide member 7a and the neutral guide member 7b are fixed using the common connecting member 73 in this example, separate connecting members may be used for fixing them individually.

Figure 3:
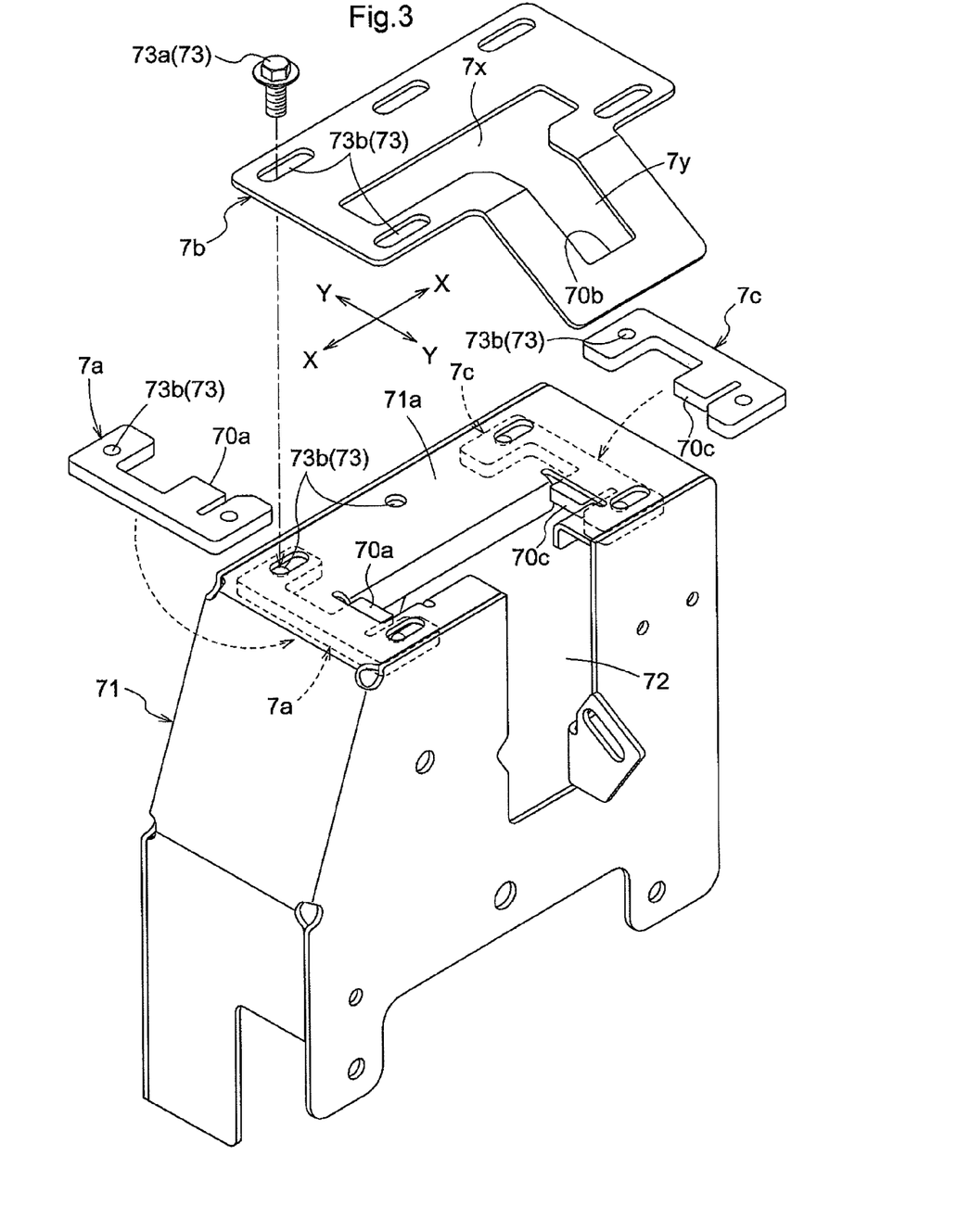
FIG. 3 is an exploded perspective view of another basic arrangement of the guide unit.

In the example shown in FIGS. 1A, 1B and 2, the other end of the movement limit of the shift lever 60 in the direction X (opposite side of the end of the movement limit of the lever for defining the maximum forward speed) is defined by an end of the X-direction guide groove 7x formed in the neutral guide portion 7b facing the forward-drive stop surface 70a formed in the maximum forward speed guide member 7a and coming into contact with the shift lever 60. When the variable propelling power supply section is configured to supply reverse drive power to the propelling drive wheels from forward drive power through the neutral position based on the first shift movement along the direction X, the movement limit of the shift lever 60 at the other end of the direction X defines a maximum reverse speed. When it is also required to determine the maximum reverse speed precisely, a maximum reverse speed guide member 7c having a similar construction to the above-noted maximum forward speed guide member 7a (those guide members should be arranged in mirror symmetry) may be provided for defining the other end of the movement limit of the shift lever 60 in the direction X coming into contact with the shift lever 60, as shown in FIG. 3. Here, another slot is formed in the neutral guide member 7b as an additional bolt bore 73b while another round bolt bore is formed in the mounting portion 71a as an additional bolt bore 73b.

With the guide unit 7 having the above arrangement, the positional adjustment and fixation of the maximum forward speed guide member 7a, the maximum reverse speed guide member 7c and the neutral guide member 7b relative to the mounting portion 71a may be made according to the following steps:

1. To attach the shift lever 60 to the housing 71.
2. To set the shift lever 60 to a control position in which the variable propelling power supply section is in neutral (neutral position).
3. To positionally adjust the neutral guide member 7b to allow the shift lever 60 standing in the neutral guide member 7b to move in the direction Y from the neutral position to the neutral stop surface 70b.
4. To insert the bolt 73a into one set of the central bolt bores 73b of the mounting portion 71a and the neutral guide member 7b to fix the neutral guide member 7b to the mounting portion 71a.
5. To set the shift lever 60 to the maximum forward speed position.
6. To positionally adjust the maximum forward speed guide member 7a to bring the forward-drive stop surface 70a of the maximum forward speed guide member 7a into contact with the shift lever 60.
7. To insert the bolts 73a into the two corresponding bolt bores 73b formed in the mounting portion 71a, maximum forward speed guide member 7a and neutral guide member 7b, thereby to fix the maximum forward speed guide member 7a to the mounting portion 71a along with and the neutral guide member 7b.
8. To set the shift lever 60 to the maximum reverse speed position.
9. To positionally adjust the maximum reverse speed guide member 7c to bring the reverse-drive stop surface 70c of the maximum reverse speed guide member 7c into contact with the shift lever 60.
10. To insert the bolts 73a into the two corresponding bolt bores 73b formed in the mounting portion 71a, maximum forward speed guide member 7a and neutral guide member 7b, thereby to fix the maximum reverse speed guide member 7c to the mounting portion 71a along with and the neutral guide member 7b.

In the above description, the bolt 73a and bolt bores 73b are employed as a device for fixing the maximum forward speed guide member 7a, neutral guide member 7b and maximum reverse speed guide member 7c to the mounting portion 71a to be positionally adjustable. The slot and the round bore are employed as the bolt bores. The allocation of the slot or the round bore to each of the bolt bores may be desirably made as long as they are positionally adjustable. Further, any other fixing device that is positionally adjustable, other than the combination of the bolt 73a and bolt bores 73b, may be employed such as a screw-slide mechanism or shim-adjustment mechanism.

Figure 4:
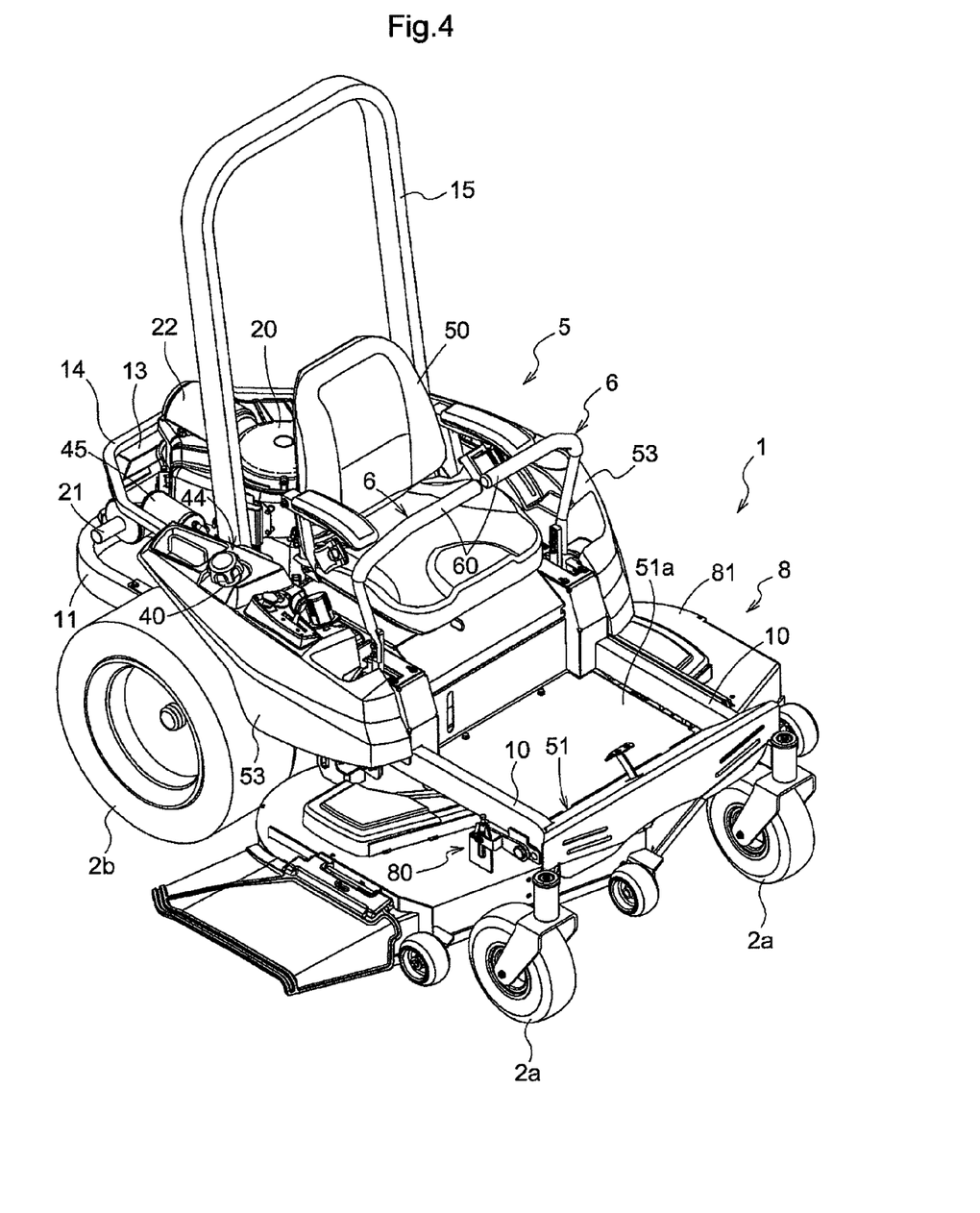
FIG. 4 is an overall schematic view of a zero-radius-turning mower exemplifying an embodiment of the present invention.

The specific embodiments of the present invention will be described hereinafter in reference to the accompanying drawings. As shown in FIG. 4, the work vehicle according to the present invention is represented by a ride-on lawn mower including a vehicle body 1 supported to a right and left pair of front wheels 3a and a right and left pair of rear wheels 3b. This type of ride-on lawn mower is also termed as a zero-radius-turning mower, in which the right and left rear wheels 2b are independently controlled in forward/reverse drive speed.

The vehicle body 1 includes a front frame 10 and a rear frame 11 made of square pipe material, for example, as main components. A mower unit 8 is suspended from the front frame 10 between the right and left pair of front wheels 3a and the right and left pair of rear wheels 3b to be vertically movable through an unillustrated link mechanism. The link mechanism functions to vertically move the mower unit 8 in a horizontal position through pedal control or lever control.

A boarding platform 51 made of sheet metal is provided to substantially cover the entire front frame 10 from above. A rubber mat 51a is laid over a surface of the boarding platform 51. A driver's seat 50 is positioned one level higher rearwardly of the boarding platform 51. Fenders 53 and handle units 6 having shift levers 60 are provided in lateral opposite sides of the driver's seat 50, respectively. Various shift levers and control buttons are arranged on a top surface of each fender 53. A gate-shaped ROPS frame 15 vertically extends rearwardly of the driver's seat 50. The ROPS frame 15 is made of square pipe material. In this type of ride-on lawn mower, a front area forwardly of the ROPS frame 15 of the vehicle body 1 is defined as a driver's section 5, while a rear area rearwardly of the ROPS frame 15 of the vehicle body 1 is defined as a drive section 2.

The rear frame 11 has an arched shape as viewed from the top with a right and left pair of straight frame portions extending longitudinally in the vicinity of the rear wheels 3b and a curved frame portion projecting rearward for connecting the right and left straight frame portions to each other. A substantially horizontal mounting deck 12 for receiving various devices constituting a power supply unit including an engine 20 is provided rearwardly of the driver's seat 50, which is formed as a top surface of a floor material mounted on the rear frame 11 in the current embodiment. Further, vertical frames 13 extend from an upper portion of the rear frame 11 to be spaced from each other by a predetermined interval. A cylindrical outer frame 14 having a similar shape to the contour of the rear frame 11 is attached to upper portions of the vertical frames 13.

The engine 20 is mounted in the central part of the mounting deck 12 with an output shaft thereof projecting downward. A fuel tank 40 is mounted over a region from a front area to a right-side area of the engine 20. The fuel tank 40 consists of a main tank body mounted under the driver's seat 50 forwardly of the engine 20, and an auxiliary tank body extending vertically on the right side of the engine 20 rearwardly of the driver's seat 50. In FIG. 4, only an oil-feeding unit 44 attached to a top portion of the auxiliary tank body is explicitly shown. The main tank body has a flat top surface and thus can be arranged efficiently along a lower surface of the driver's seat 50. The auxiliary tank body has a rectangular section elongated transversely of the vehicle body as viewed from the top and extends higher than the main tank body with the top portion thereof positioned at a level beyond the cylindrical outer frame 14.

A canister 45 is placed adjacent to a rear side of the auxiliary tank body of the fuel tank 40. The canister 45 is connected to an air intake system of the engine 20 through an unillustrated purge conduit (hose), and is connected to the fuel tank 40 through an unillustrated fuel gas conduit (hose). Further, a muffler 21 is placed on a rearmost portion of the mounting deck 12. An air cleaner 22 is mounted in a position higher than the engine 20. An engine cooling fan is provided above the engine 20 to be rotatable in unison with the output shaft of the engine 20, which is hidden in the drawings by an air-introducing housing of the engine 20.

Figure 5:
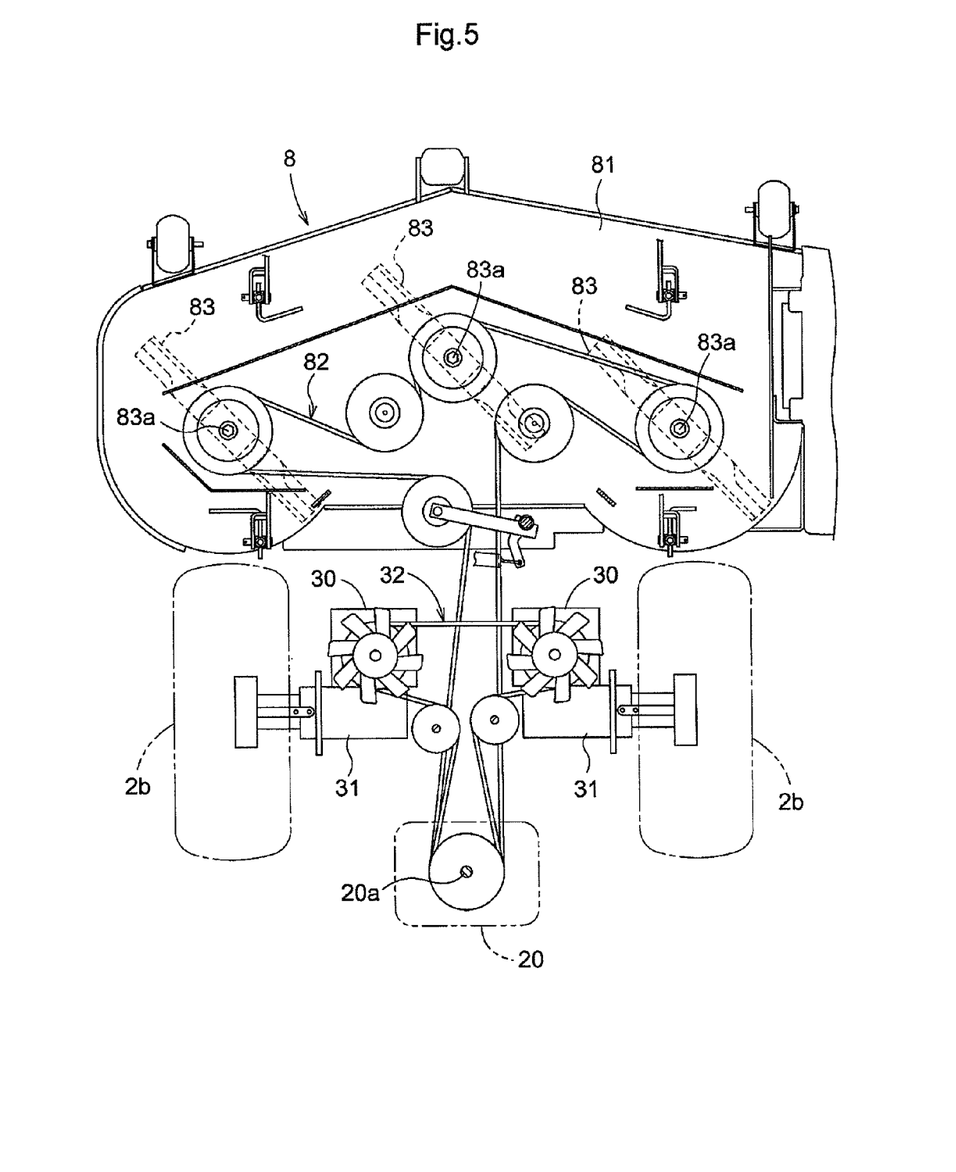
FIG. 5 shows a power transmission system of the zero-radius-turning mower.
Figure 6:
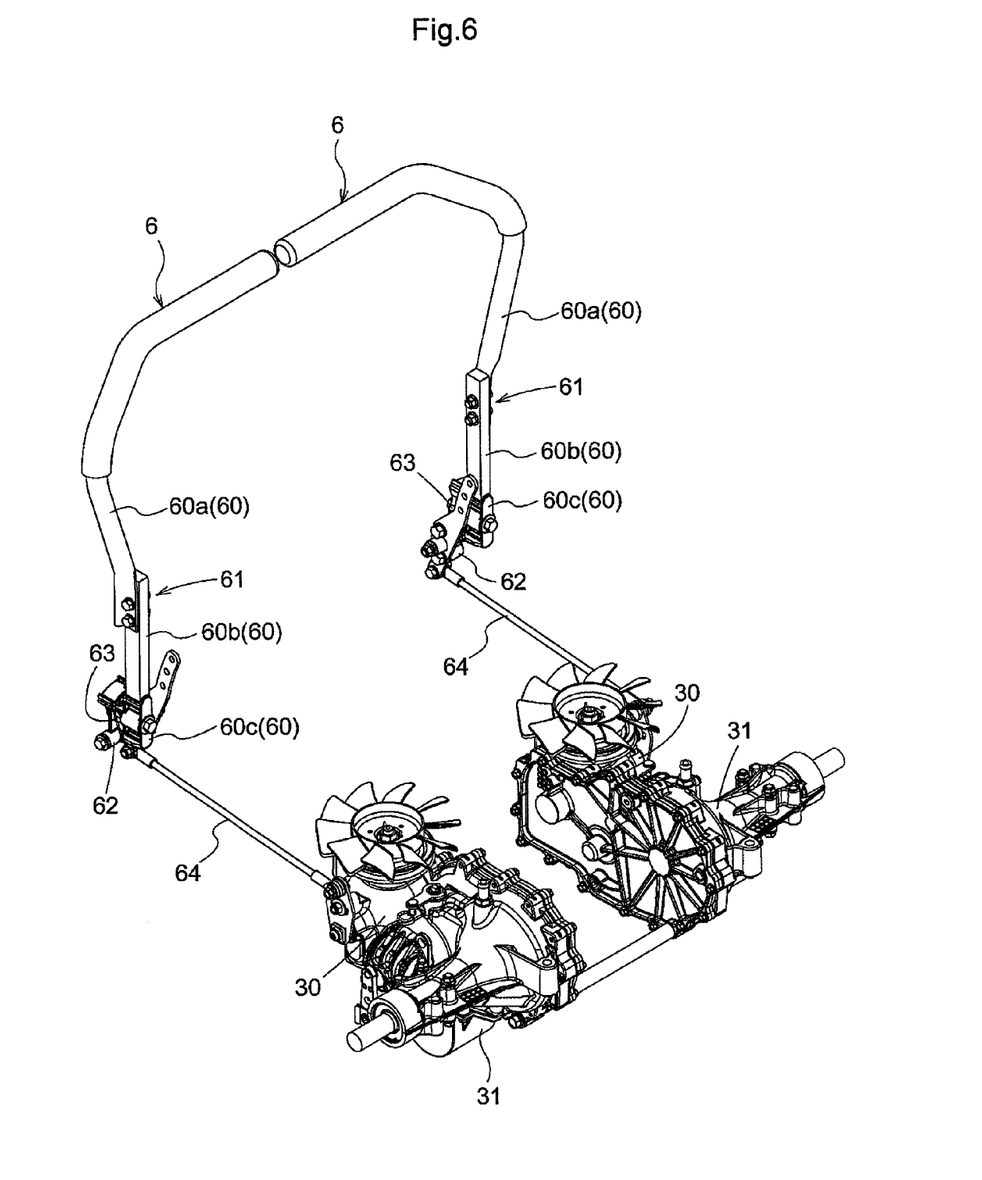
FIG. 6 is a perspective view showing the relationship between the handle unit and a speed-change device.
Figure 7:
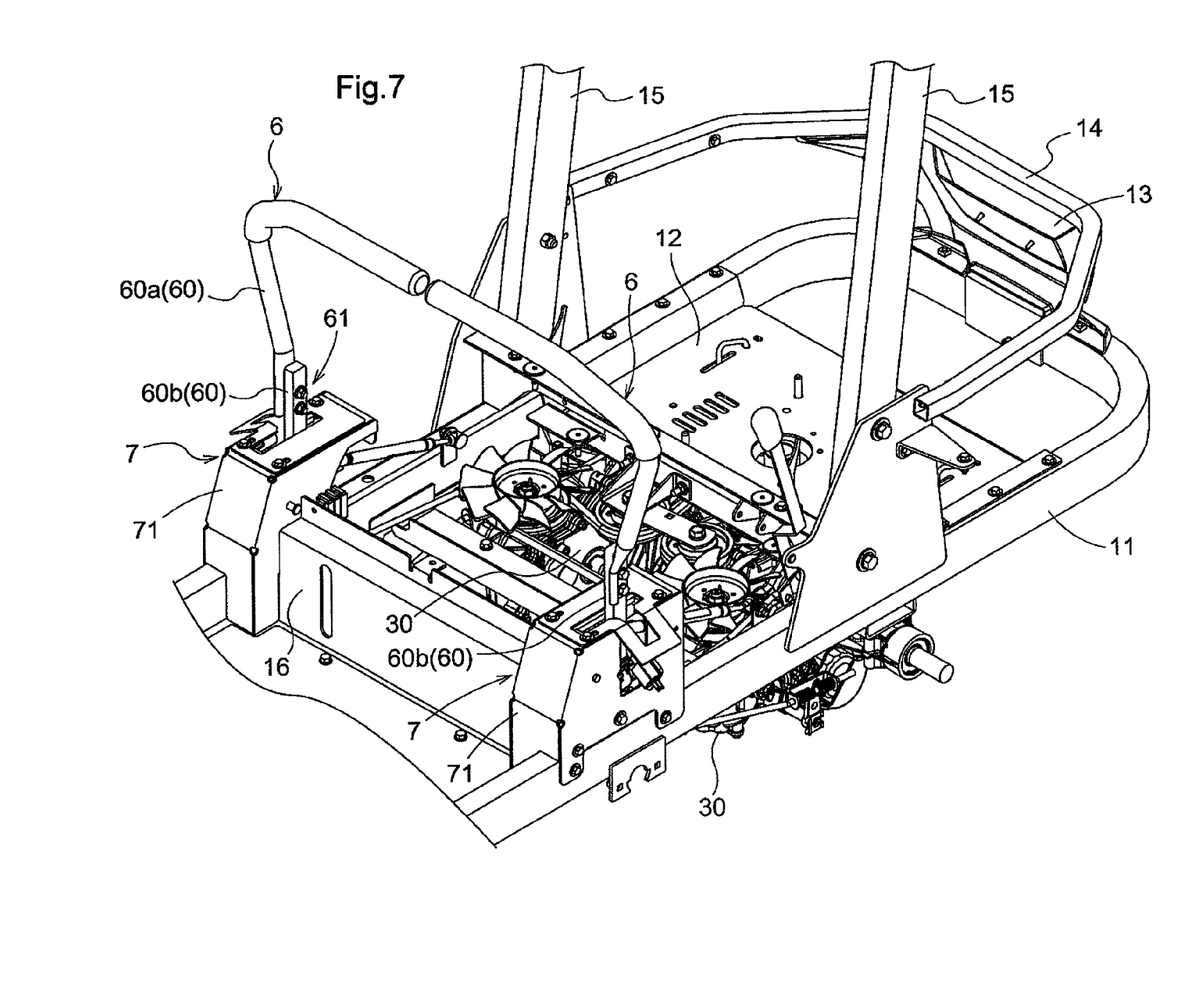
FIG. 7 is a perspective view of the handle unit and guide unit mounted on a vehicle body.

In association with each of the right and left rear wheels 3b, an HST (hydrostatic transmission) 30 and a gear transmission mechanism 31 for transmitting drive power to the rear wheel 3b are provided as schematically shown in FIGS. 5 to 7. A propelling-line belt transmission mechanism 32 includes pulleys mounted in the output shaft 20a of the engine and the respective HSTs 30 so that output from the engine is transmitted to each HST. A shift control shaft for each HST (not shown) is linked to an associated shift lever 60 of the handle unit 6 through a control link mechanism 64 so that shifting operation is performed in response to longitudinal oscillating movement of each of the shift levers 60 mounted directly forwardly and laterally of the driver's seat 50.

With the above arrangement, either of the right and left shift levers 60 is oscillated longitudinally to shift the HST 30 associated with the oscillated shift lever 60, which allows the right and left rear wheels 3b to be independently speed changed. More particularly, in this type of ride-on lawn mower, the right and left front wheels 3a are followably steered while the right and left rear wheels 3b are independently driven for speed change, thereby to desirably produce a stop state for stopping the right and left rear wheels 3b, a straight-forward traveling state for driving the right and left rear wheels 3b forwardly or reversely at the same speed, a gentle-turn state for driving the right and left wheels 3b forwardly or reversely at different speeds, a pivot-turn state for stopping one of the right and left rear wheels 3b while driving the other of them forwardly or reversely, and a spin-turn state for driving one of the right and left rear wheels 3b forwardly while driving the other of them reversely.

Each of the shift levers 60 has a control lever portion 60a with a grip extending horizontally in a transverse direction of the vehicle body to be gripped by the operator, and a lever proximal portion 60b connected to the control lever portion 60a through a connecting portion 61. The lever proximal portion 60b employs the same basic arrangement of the handle unit 6 as described in reference to FIG. 1, in which the lever proximal portion 60b is housed in the interior of a housing 71 consisting of a front wall, a rear wall, two side walls and a ceiling wall. The housing 71 is attached to the rear frame 11 or the front frame 10 of the vehicle body 1. Two housings 71 are connected to each other through a cross member 16 made of sheet metal. A first oscillation bracket member 62 is formed on the lever proximal portion 60b arranged between the opposite side walls of the housing 71. The lever proximal portion 60b is supported to be pivotable about an X-direction pivotal axis 6x received by the first oscillation bracket member 62. Further, on the lever proximal portion 60b is also formed a second oscillation bracket member 63 pivotable about a Y-direction pivotal axis 6y relative to the first oscillation bracket member 62. The X-direction pivotal axis 6x and the Y-direction pivotal axis 6y intersect each other at right angles. This arrangement allows the control lever portion 60a to be oscillatably shifted in the longitudinal direction of the vehicle body (direction X) and in the transverse direction of the vehicle body (direction Y). The housing 71 has an opening 72 for allowing the shift movement of the lever proximal portion 60b following the movement of the control lever portion 60a to oscillate in the two directions of the direction X and the direction Y.

In the current embodiment, a guide unit 7 employs the basic arrangement described in FIG. 1. Thus, the guide unit 7 includes principal components consisting of a maximum forward speed guide member 7a and a neutral guide member 7b connected to a mounting portion 71a formed on the ceiling wall of the housing 71 through a bolt 73a, the maximum forward speed guide member 7a being held between the mounting portion 71a and the neutral guide member 7b. The maximum forward speed guide member 7a has a forward-drive stop surface 70a coming into contact with the lever proximal portion 60b oscillated forwardly of the vehicle body in the direction X to define a maximum forward drive speed. The neutral guide member 7b has an X-direction guide groove 7x for guiding oscillating movement of the lever proximal portion 60b in the direction X, and a Y-direction guide groove 7y for guiding oscillating movement of the lever proximal portion 60b in the direction Y in the neutral position. The X-direction guide groove 7x has a terminal end portion acting as a reverse-drive stop surface 70c formed rearwardly of the vehicle body, and the Y-direction guide groove 7y has a terminal end portion acting as a neutral stop surface 70b. While only heads of the bolts are visually confirmed in FIG. 7, FIG. 3 shows that three slots 73b elongated in the longitudinal direction of the vehicle body are formed in three corner portions of the mounting portion 71a for receiving the connecting bolts 73a, and corresponding three slots are also formed in the neutral guide member 7b to align with the three slots 73b. In addition, two round bores are formed in the maximum forward speed guide member 7a. The shapes of the bolt bores 73b formed in the maximum forward speed guide member 7a and a mounting portion 71a of the neutral guide member 7b may be the combination of one slot and one round bore. Instead, both bores may be formed as slots. The shapes of the bolt bores may be desirably selected as long as they are positionally adjustable.

Figure 8:
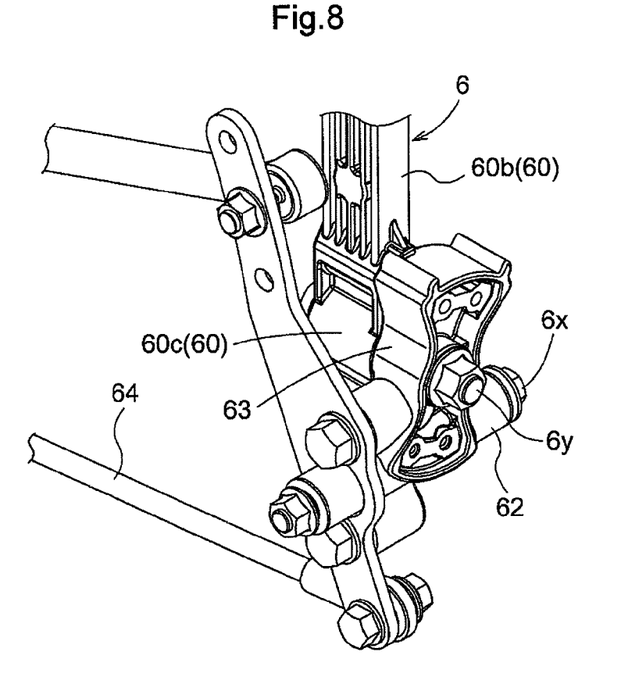
FIG. 8 a perspective view of a detent mechanism mounted on the handle unit.
Figure 9:
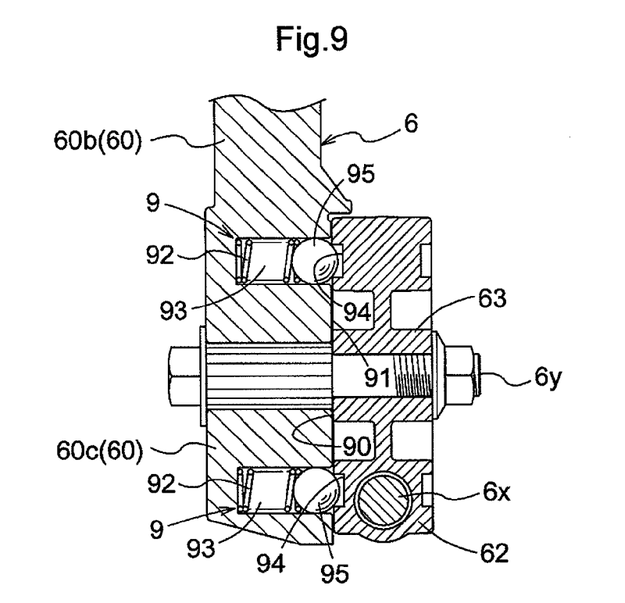
FIG. 9 is a sectional view of the detent mechanism.

As shown in detail in FIGS. 8 and 9, a detent mechanism 9 is provided between an outer oscillation surface 90 and an inner oscillation surface 91 contacting each other to be relatively rotatable as the shift lever 60 is oscillated about the Y-direction pivotal axis 6y. The outer oscillation surface 90 is formed on the second oscillation bracket member 63, while the inner oscillation surface 91 is formed on the control lever portion 60c connected through the Y-direction pivotal axis 6y that also acts as a connecting pin. In the control lever portion 60c are formed spring chambers 93 each housing a spring 92 on either side of a through bore for receiving the Y-direction pivotal axis 6y to open at the inner oscillation surface 91. A detent ball 95 is inserted to each of the spring chambers 93 urged by the spring 92 to be pressed against the outer oscillation surface 90. On the other hand, a recess 94 is formed in the second oscillation bracket member 63 to open at the outer oscillation surface 90, having a size for receiving part of the detent ball 95. The recess 94 is positioned so that the detent ball 95 is inserted into the recess at an oscillation angle defined by an operational neutral position in which the shift lever 60 is in neutral within the X-direction guide groove 7x and at an oscillation angle defined by a rest neutral position in which the shift lever 60 is in neutral within the Y-direction guide groove 7y. In this example, two recesses 94 are provided, one of which is dimensioned to receive the detent ball 95 in the operational neutral position, and the other of which is dimensioned to receive the detent ball 95 in the rest neutral position. Such a detent mechanism 9 produces a sense of click when the shift lever 60 reaches the operational neutral position or the rest neutral position when the shift lever 60 is oscillated in the Y-direction guide groove 7y.

As shown in FIG. 4, the mower unit 8 is suspended from the front frame 10 between the right and left pair of front wheels 3a and the right and left pair of rear wheels 3b to be vertically movable through the link mechanism 80. As understood from FIG. 5, the mower unit 8 includes three cutting blades 83 arranged in the transverse direction of the vehicle body within a mower deck 81. Each of the cutting blades 83 is fixed to a drive shaft 83a supported to the mower deck 81. A mower-unit belt transmission mechanism 82 is provided to include pulleys mounted on the output shaft 20a of the engine 20 and each drive shaft 83a, in which output from the engine 20 is transmitted to the mower unit 8. The propelling-line belt transmission mechanism 32 and the mower-unit belt transmission mechanism 82 use the output shaft 20a of the engine 20 as an input shaft, and arranged at different levels independently of each other planarly. This arrangement allows constant-speed drive power to be transmitted to the mower unit 8 regardless of a traveling speed or traveling state.

Figure 10A:
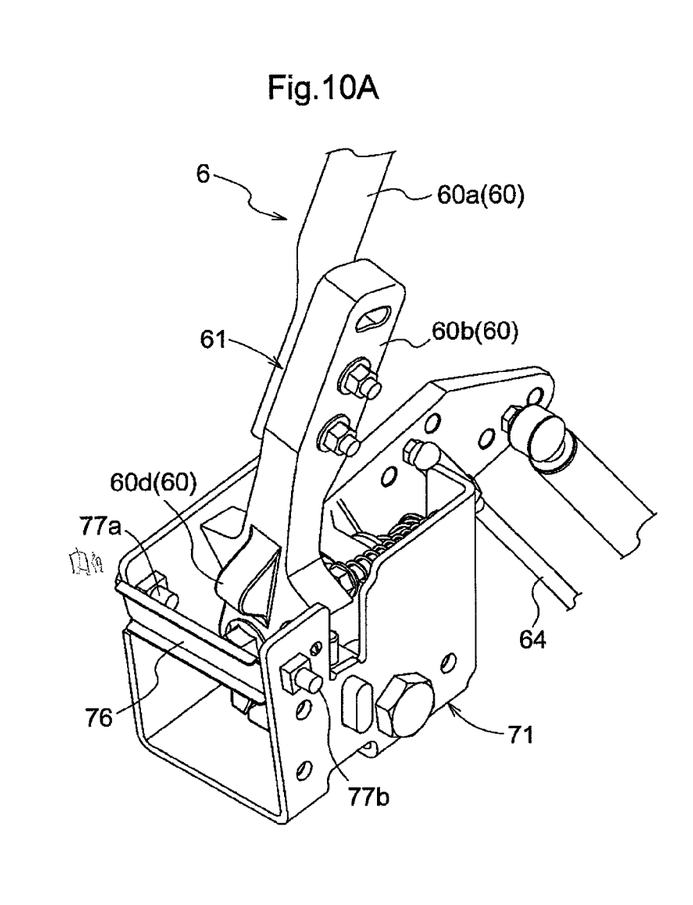
FIG. 10A is a perspective view of a maximum forward speed guide member in the neutral position according to a modified embodiment.
Figure 10B:
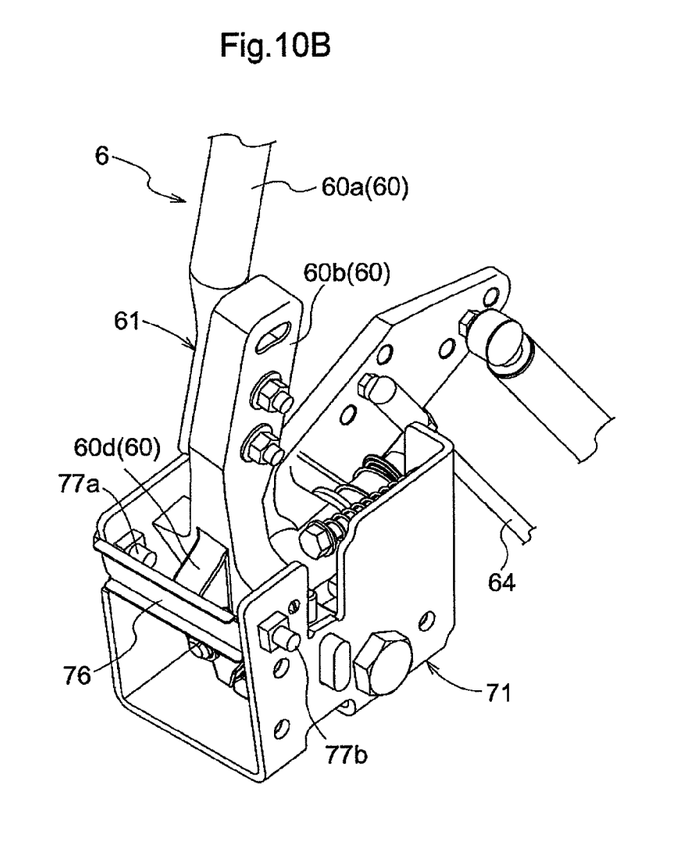
FIG. 10B is a perspective view of the maximum forward speed guide member in the maximum speed position according to the modified embodiment.
Figure 11:
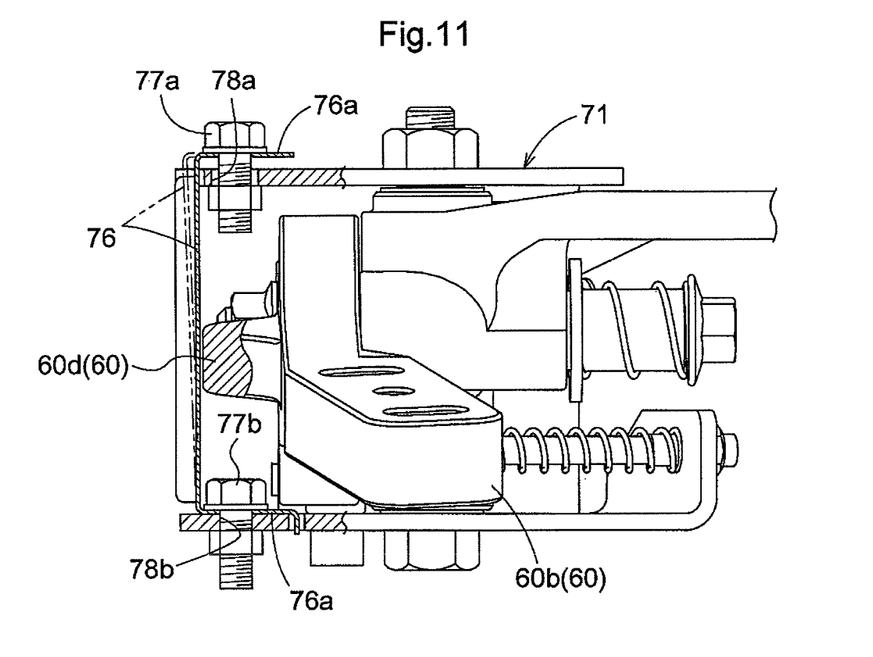
FIG. 11 is a top plan view of the maximum forward speed guide member shown in FIG. 10.

Modified Embodiments (1) In the first embodiment, the maximum forward speed guide member 7a for determining the maximum forward speed is formed as the plate material attached to the mounting portion 71a defining the ceiling wall of the housing 71, but may vary. In a modified embodiment shown in FIGS. 10A, 10B and 11, for example, the maximum forward speed guide member 7a is formed as a cross bar 76 made of a profile material having a C-shaped section bridging the side walls of the housing 71. The cross bar 76 has opposite ends 76a bent at right angles acting as mounting flanges relative to the housing 71, and an intermediate portion acting as a stopper for the shift lever 60. Thus, a position of the intermediate portion of the cross bar 76 in the direction X determines the maximum forward speed. The connecting member 73 for fixedly positioning the cross bar 76 in the housing 71 consists of connecting bolts 77a and 77b and bolt bores 78a and 78b formed in the side walls of the housing 71. The bolt bore positioned inwardly is formed as a slot 78a, and the bolt bore positioned outwardly is formed as a round bore 78b. The bent portions 76a of the cross bar 76 has round bores formed therein that agree with the diameter of the connecting bolts 77a and 77b. In this, the slot and round bore positioned inwardly of the vehicle may be inversed naturally. More particularly, the bolt bore formed in the side wall of the housing 71 positioned inwardly of the vehicle may be formed as a round bore, while the bolt bore formed in the bent portion 76a of the cross bar 76 positioned inwardly of the vehicle may be formed as a slot. Further, an opening is formed in an inner wall of the fender 53 accommodating the housing 71 for allowing access to the corresponding connecting bolt 77a. With this arrangement, the fixing position is adjustable in the direction X within a predetermined range by the connecting bolt 77a easily accessible from the inside of the vehicle body. On the other hand, the outer bolt bore is formed as a round bore 78b to connect the cross bar 76 to the housing 71 through the connecting bolt 77b without making positional adjustment. As a result, any opening is unnecessary in an outer wall of the fender 53 for allowing access to the connecting bolt 77b, which may maintain an esthetic appearance of the vehicle. More particularly, in the maximum forward speed guide member 7a in this arrangement, the connecting bolt 77a is loosened from the inside of the vehicle body, thereby to allow a contacting position between the cross bar 76 and the shift lever 60 to be adjustable. Naturally, the connecting bolt 77a and slot 78a may be provided in the outside of the vehicle body, instead of the inside of the vehicle body, to make positional adjustment from the outside of the vehicle body.

(2) The handle unit 6 described in the first embodiment includes the oscillatable shift lever 60. Instead, any other type such as a slidable shift lever, for example, may be employed.

(3) The variable propelling power supply section operated by the handle unit 6 uses the HST in the first embodiment. Instead, any other variable speed-change device such as a belt-type variable speed-change device may be employed.

(4) In the first embodiment, the present invention is applied to a mid-mount lawn mower, to a zero-radius-turning mower, in particular. Instead, the present invention is also applicable to a front-mount lawn mower or work vehicles other than the lawn mower.

What is claimed is:

1. A self-propelling work vehicle for forward and reverse drive comprising:
   a vehicle body;
   a variable propelling power supply section for supplying forward drive power and reverse drive power to propelling drive wheels;
   a handle unit attached to the vehicle body for a first shift movement along a first direction with a neutral position and a second shift movement from the neutral position along a second direction intersecting the first direction, wherein forward drive speed or reverse drive speed is determined based on the first shift movement;
   a guide unit including a maximum forward speed guide member for defining a shift movement end of the handle unit determining a maximum forward speed of the forward drive speed, and a neutral guide member for guiding the second shift movement of the handle unit from the neutral position defined as a starting position, wherein the guide unit is mounted to the vehicle body;

the maximum forward speed guide member comprising at least one opening for receiving at least one bolt so as to retain the maximum forward speed guide member in a fixed position;

the maximum forward speed guide member and the neutral guide member being positionally adjustable independently of each other; and the maximum forward speed guide member, after being positionally adjusted, remaining fixed in place with respect to the vehicle body via the bolt, wherein at least one of:

the maximum forward speed guide member and the neutral guide member are slidable relative to one another when positionally adjusted and are disposed one above another after being positionally adjusted; and/or the maximum forward speed guide member and the neutral guide member are slidable relative to a common surface of the vehicle body and overlie one another after being positionally adjusted.

2. The self-propelling work vehicle as claimed in claim 1, wherein the handle unit and the guide unit are indirectly attached to the vehicle body through a housing for covering a proximal portion of the handle unit.

3. The self-propelling work vehicle as claimed in claim 2, wherein the maximum forward speed guide member and the neutral guide member are fixable to one another and to the vehicle body via the at least one bolt.

4. The self-propelling work vehicle as claimed in claim 1, wherein the at least one opening comprises slots.

5. The self-propelling work vehicle as claimed in claim 1, wherein the first shift movement is movement oscillatable about a first pivotal axis and the second shift movement is movement oscillatable about a second pivotal axis, and wherein a first oscillation bracket member is fitted on the first pivotal axis while a second oscillation bracket member is fitted on the second pivotal axis and mounted on the first oscillation bracket member.

6. The self-propelling work vehicle as claimed in claim 5, wherein a detent mechanism having a constantly-urged detent ball is disposed between the second oscillation bracket member and a shift lever oscillatable about the second pivotal axis.

7. The self-propelling work vehicle as claimed in claim 1, wherein the guide unit further includes a shift guide portion for guiding the second shift movement, the shift guide portion being integrally formed with the neutral guide member.

8. The self-propelling work vehicle as claimed in claim 1, wherein the maximum forward speed guide member is formed as a cross member extending in a direction transversely of the first direction and connected at opposite ends thereof to the vehicle body directly or indirectly through a first connecting portion and a second connecting portion, the first connecting portion being adjustable in fixing position to vary a position of the cross member in the first direction by elastic deformation of the cross member with the second connecting portion being connected.

9. The self-propelling work vehicle as claimed in claim 8, wherein the first connecting portion consists of a connecting element and a slot receiving therein the connecting element.

10. The self-propelling work vehicle as claimed in claim 1, wherein the guide unit further includes a maximum reverse speed guide member for defining an end of the second shift movement of the handle unit determining a maximum reverse speed.

11. The self-propelling work vehicle as claimed in claim 1, wherein the neutral guide member is configured to provide an entire range of movement of the handle unit along the second shift movement.

12. The self-propelling work vehicle as claimed in claim 11, wherein the handle unit can move along the second shift movement only between:

the neutral position defined as a starting position; and a position determined by a neutral stop surface integrally formed on the neutral guide member.

13. The self-propelling work vehicle as claimed in claim 1, wherein the maximum forward speed guide member comprises first and second projecting portions, and wherein the at least one opening comprises first and second openings.

14. The self-propelling work vehicle as claimed in claim 13, wherein the first opening is arranged on the first projecting portion and the second opening is arranged on the second projecting portion.

15. The self-propelling work vehicle as claimed in claim 14, wherein the maximum forward speed guide member is a one-piece member and comprises a stop surface located between the first and second projecting portions.

16. The self-propelling work vehicle as claimed in claim 1, wherein the maximum forward speed guide member and the neutral guide member slidably engage:

one another when positionally adjusted; or the vehicle body when positionally adjusted.

17. A self-propelling work vehicle for forward and reverse drive comprising:

a vehicle body;

a variable propelling power supply section for supplying forward drive power and reverse drive power to propelling drive wheels;

a handle unit attached to the vehicle body for a first shift movement along a first direction with a neutral position and a second shift movement from the neutral position along a second direction intersecting the first direction, wherein forward drive speed or reverse drive speed is determined based on the first shift movement;

a guide unit attachable to the vehicle body and comprising slidable members positioned one above the other; and said slidable members comprising:

a maximum forward speed guide plate member configured to define a shift movement limit position that determines a maximum forward speed of the forward drive speed; and a neutral guide member configured to guide the second shift movement of the handle unit from the neutral position defined as a starting position, wherein the maximum forward speed guide plate member and the neutral guide member are positionally adjustable independently of each other.

18. The self-propelling work vehicle as claimed in claim 17, wherein the neutral guide member is a neutral guide plate member.

19. The self-propelling work vehicle as claimed in claim 17, wherein the neutral guide member comprises:

a rectangular main section having fastener receiving slots; and a second smaller section oriented at an angle relative to a planar surface of the rectangular main section.

20. The self-propelling work vehicle as claimed in claim 19, wherein the rectangular main section includes an elongated slot defining the first shift movement along the first direction and the second smaller section includes an elongated slot defining the second shift movement of the handle unit and a neutral stop limiting movement of the handle unit along the second direction.

21. The self-propelling work vehicle as claimed in claim 17, wherein:
the handle unit is movably guided by the neutral guide member:
from a reverse speed position to a forward speed position;
from a reverse speed position to the neutral position defined as a starting position;
from a forward speed position to the neutral position defined as a starting position;
from a maximum forward speed position to the neutral position defined as a starting position; and
from the neutral position defined as a starting position to a neutral stop position; and
the handle unit contacts the maximum forward speed guide plate member only in the maximum forward speed position.

22. A self-propelling work vehicle for forward and reverse drive comprising:
a vehicle body;
a variable propelling power supply section for supplying forward drive power and reverse drive power to propelling drive wheels;
a handle unit attached to the vehicle body for a first shift movement along a first direction with a neutral position and a second shift movement from the neutral position along a second direction intersecting the first direction, wherein forward drive speed or reverse drive speed is determined based on the first shift movement;
a guide unit attachable to a portion of the vehicle body and comprising:
a maximum forward speed guide plate member configured to define a shift movement limit position that determines a maximum forward speed of the forward drive speed, said maximum forward speed guide plate member having a mounting opening and being mounted to the portion so as to slide relative to the portion during positional adjustment; and
a neutral guide plate member configured to guide the second shift movement of the handle unit from the neutral position defined as a starting position, said neutral guide plate member having a mounting opening and being mounted to the portion so as to slide relative to the portion during positional adjustment,
wherein the maximum forward speed guide plate member and the neutral guide member are slidably positionally adjustable independently of each other.

* * * * *